US006189445B1

(12) United States Patent
Knorr et al.

(10) Patent No.: US 6,189,445 B1
(45) Date of Patent: Feb. 20, 2001

(54) HEATING DEVICE FOR AN INSTALLATION PRODUCING CORRUGATED CARDBOARD

(75) Inventors: Andreas Knorr, Nürnberg; Thomas Hecky, Weiden, both of (DE)

(73) Assignee: BHS Corrugated Machinen und Anlangenbau GmbH, Weiherhammer (DE)

(*) Notice: Under 35 U.S.C. 154(b), the term of this patent shall be extended for 0 days.

(21) Appl. No.: 09/271,230

(22) Filed: Mar. 17, 1999

(30) Foreign Application Priority Data

Mar. 18, 1998 (DE) ........................................... 198 11 858

(51) Int. Cl.[7] ........................................... B32B 31/20

(52) U.S. Cl. ......................... 100/311; 100/211; 100/309; 156/583.5

(58) Field of Search ................................... 100/306, 309, 100/310, 311, 151, 154, 211; 156/206, 470, 581, 583.5

(56) References Cited

U.S. PATENT DOCUMENTS 5,421,951 * 6/1995 Troutner et al. ..................... 100/306
5,456,783 * 10/1995 Sissons ................................ 100/311
5,561,918 10/1996 Marschke .
5,611,267 * 3/1997 Lauderbaugh ....................... 100/310

FOREIGN PATENT DOCUMENTS

559181 A1 9/1993 (EP) .
623459 11/1994 (EP) .

* cited by examiner

*Primary Examiner*—Peter Vo
*Assistant Examiner*—Louis L. Huynh
(74) *Attorney, Agent, or Firm*—Shaffer & Culbertson, LLP

(57) ABSTRACT

A heating device (1) for a corrugated cardboard installation includes several heating plates (3), arranged successively in the direction of advance of a corrugated cardboard web (2). Heating device (1) also includes at least one pressure unit (5), consisting of a bearing (6) arranged diagonally or transverse with respect to the direction of advance of the corrugated cardboard web (2). At least one pressure element (7) is attached to the bearing (6). The pressure element (7) is connected with the bearing (6) in a freely movable manner via at least one elastic medium (11). The elastic medium transfers the weight of the bearing (6) to the pressure element (7).

38 Claims, 11 Drawing Sheets

HEATING DEVICE FOR AN INSTALLATION PRODUCING CORRUGATED CARDBOARD

BACKGROUND OF THE INVENTION

The invention relates to a heating arrangement for an installation producing corrugated cardboard. More particularly, the heating arrangement includes several heating plates arranged successively in the direction of movement of a corrugated cardboard web and at least one pressure unit consisting of a bearing, arranged diagonally with respect to the direction of advance of the corrugated cardboard web at which at least one pressure element is attached.

Such a device in an installation producing corrugated cardboard has the task of drying glue between superposed webs, that is, one-sided corrugated cardboard webs and finally the cover web.

For this purpose, a known arrangement has heating plates which are heated, for example, with the vapor of a thermo-oil. With the aid of a pressure unit and its driven lower belt, a conveyor belt moves the corrugated cardboard webs to be glued along the surface of the heating plates. Load elements press the corrugated cardboard webs against the surfaces of the heating plates in order to achieve an appropriate contact of the corrugated cardboard web with the heating plate surface, that is, in order to achieve a good heat transfer toward the gluing line.

As pressure units, several systems are known. For example, pressure units may use tension rollers, a pressure hood operating with compressed air, elements which rest directly on the conveyor belt due to their own weight, or plates which are pressed against the conveyor belt by means of a spring force.

When pressure hoods such as that shown in European Patent Publication 0 412 255 A1 are used, an additional energy output for the compressed air is necessary in order to press the pressure hood onto the corrugated cardboard web. Furthermore, a certain noise level occurs in the drying area. Moreover, heat energy is unnecessarily transported and the adjustment of the working width is costly.

In the case of systems where elements press with their own weight on the belt, such as shown in European Patent publication 0 559 181 A1, no damping effect is present so that significant dynamic forces can occur. The load elements are at a relatively great distance from the friction surface so that the friction moment can become relatively great. Moreover, the load elements are subjected to a tendency toward turning which may lead to a deterioration of uniform surface contact with the heating plate surface.

The state of the art also includes to a pressure unit in which lower plates are pressured via compressed air chambers, as shown in U.S. Pat. No. 5,526,739. The construction of this known device is costly and the device also has the disadvantage that the pressure is not uniformly applied.

Canadian Patent No. 2,179,921 shows a pressure unit in the form of a load plate which consists of several units extending along the corrugated cardboard web. With this system, the corrugated cardboard web is pressured directly, possibly resulting in undesirable damage.

Another known pressure unit uses tension rollers which are attached via intermediate levers at a bearing arranged diagonally with respect to the direction of advance of the corrugated cardboard web as shown in U.S. Pat. No. 5,632,830. However, uniform pressure on the corrugated cardboard web is not assured with this system.

Moreover, in the case of pressure units with tension rollers, the rollers must not cause any jolts, oscillations or vibrations which could damage the corrugated cardboard web. During operation, it is also necessary for the tension rollers and the heating plates to be almost perfectly level so that an appropriate contact of the corrugated cardboard web and the heating plates can be realized.

From the state of the art on which the present invention is based, European Patent publication 0 623 459 B1 shows a system in which a spring force is applied to plates. This system also uses a conveyor belt. Each pressure plate is mounted to a rigid traverse via a double-jointed lever system, so that the pressure plate undergoes a plane, parallel movement. The pressure plate is pressured via spring elements.

With this known system, it is disadvantageous that the pressure plate is not always aligned parallel with the heating surface due to possible mounting deviations and/or unevennesses of the heating surface. An additional disadvantage is that the spring deflection and therefore also the pressing force change with variation of the corrugated cardboard thickness. It is necessary to adjust the tension of each pressure plate in accordance with the corrugated cardboard type used.

SUMMARY OF THE INVENTION

It is an object of the present invention to provide a corrugated cardboard facility heating arrangement with a pressure unit which prevents the above-mentioned disadvantages and is capable of pressuring the corrugated cardboard web evenly and in a safely functioning manner involving minimal construction.

In accordance with the invention, this object is accomplished with a pressure element connected with the bearing in a freely movable manner at least via one elastic medium or element, and with the bearing freely resting on the pressure element via the elastic medium with its own weight. Due to the possibility for free movement of the pressure element in all degrees of freedom, the result is the advantage of a uniform pressure on the corrugated cardboard web to be processed. This results in the achievement of a considerable improvement in quality. The entire force, either due to dead weight and/or due to additional pressuring via load devices, is distributed evenly across the entire surface onto the pressure element and via the latter onto the corrugated cardboard web.

In an additional embodiment of the invention, the bearing may engage the machine frame on both sides of the corrugated cardboard web in the plane of the upper surface of the conveyor belt at its lower flight. This results in a positive force ratio of the pressure element with respect to the pressured upper surface of the lower half of the conveyor belt. Furthermore, shock elements can be used which take over friction forces from the pressure element. These shock elements are relatively near the friction surface in order to minimize the torque on the pressure element. The entire unit is aligned in such a way, that possible tendencies towards tipping on the part of the pressure elements during an unexpected increase in friction can be prevented.

The pressure elements may be provided with stop screws in order to limit vertical movement.

According to one embodiment of the invention, there exists the possibility of introducing at least one intermediate element and at least one intermediate lever between the bearing and the machine frame.

Alternatively, also in the direction of advance of the corrugated cardboard web, at least one chain may be used whose links are engaged by the individual pressure elements. This chain may be located in a guide of the machine frame and may have an angle element pressured by a lifting element.

The elastic medium which is located between the bearing and the pressure element may be at least a spring or at least a rubber element or an elastic air hose evenly pressuring the freely movable pressure element.

According to one embodiment of the invention, there exists the possibility for the pressure element to surround the bearing. Here, the bearing may be inserted between pairs of springs of the pressure element on the upper and lower side, wherein the bearing is connected with the shock elements pressuring the inside of the pressure element.

In another embodiment of the invention, there is the possibility that the pressure element is C-shaped and is arranged horizontally via at least one elastic medium at the underside of the bearing in a freely movable manner. Between the pressure element and the underside of the bearing, an intermediate plate may be located which supports the above-mentioned shock elements.

In the above-mentioned embodiment, the bearing may be attached, respectively, via intermediate levers at a traverse extending diagonally across the corrugated cardboard web, wherein this traverse can be pressured via a piston cylinder unit. For lifting and adjustment purposes, between the intermediate lever connected with the traverse and the respective bearing, a lifting unit with peripheral elements may be used.

In order to achieve an even better adaptation to the corrugated cardboard web to be processed, there exists the possibility for the C-shaped pressure elements to have a greater length in the respective edge area and to have recesses which are arranged at a distance from each other.

According to an additional characteristic of the invention, a spring plate may rest on the entire contact width on the inner surface of the pressure element, wherein the spring plate is attached via a plate and fastening means in the pressure element.

In another embodiment of the invention, there also exists the possibility for the pressure elements and bearings to be attached at at least one circulating conveying chain, wherein this conveying chain interacts with sprocket wheels arranged at a distance from each other. Furthermore, it is possible for the pressure element to be provided with a heating arrangement, for which purpose the pressure element may have longitudinally and diagonally extending bores which are connected with at least one heating source via elastic hoses or pipes.

With all above-mentioned embodiments, it is structurally also possible to move the bearing via at least one liftable or lowerable piston cylinder unit in a vertical direction in order to apply, in addition to the dead weight of the pressure elements, an additional pressure to the corrugated cardboard web to be processed.

In an additional embodiment of the invention, the pressure elements may act on a conveyor belt or directly on the corrugated cardboard web. Moreover, the pressing device may also act on the corrugated cardboard web from below against an upper heating or support surface.

According to another characteristic of the invention, the device of the invention may be used as a pressing system in a heating section as well as in a tension section of a corrugated cardboard gluing machine.

These and other objects, advantages, and features of the invention will be apparent from the following description of the preferred embodiments, considered along with the accompanying drawings.

DESCRIPTION OF THE PREFERRED EMBODIMENTS

Figure 1:
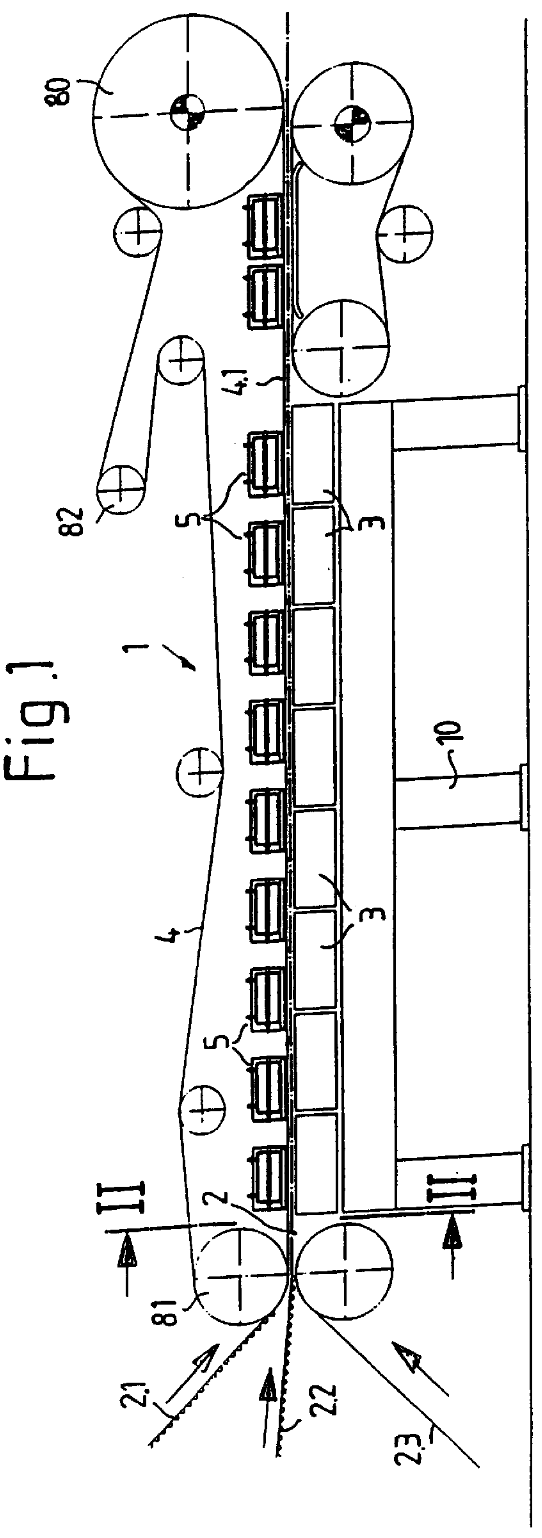
FIG. 1 shows a schematic side view of an example of the invention.

FIG. 1 shows a schematic side view of a heating arrangement 1 for a corrugated cardboard installation. Several heating plates 3 are arranged successively in the direction of advance of a corrugated cardboard web 2. Above heating plates 3, an endless conveyor belt 4 runs on rollers 80, 81 and 82. The lower half or lower flight 4.1 of this conveyor belt 4 presses against the surface of the corrugated cardboard web 2. The corrugated cardboard web 2 may be composed of a one-sided corrugated cardboard layer 2.1, an additional one-sided corrugated cardboard layer 2.2 and of a cover web 2.3.

Figure 2:
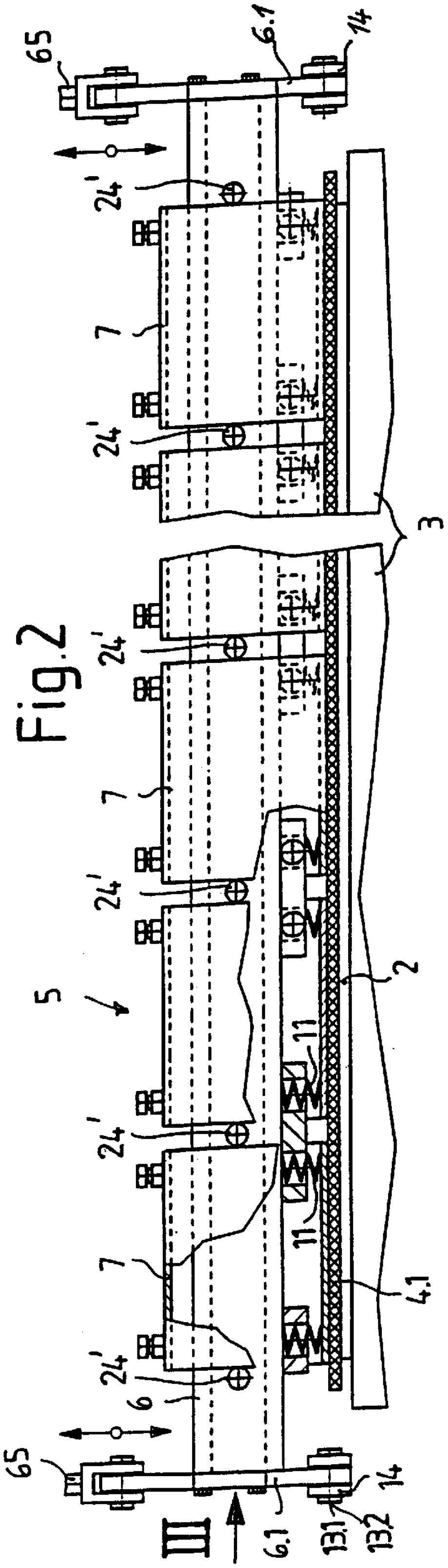
FIG. 2 shows a cross section along the line II—II in FIG. 1.
Figure 3:
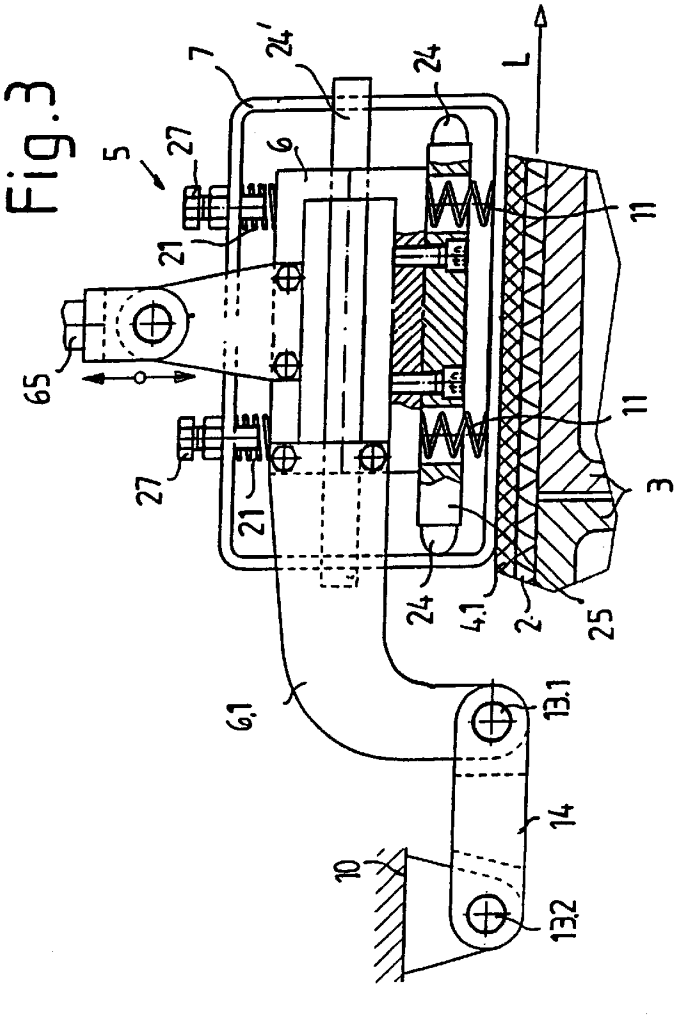
FIG. 3 shows a schematic side view of an enlarged representation of a first embodiment of the pressure element in the direction of the arrow III in FIG. 2

Furthermore, pressure units 5 are provided which, in a first embodiment shown in FIGS. 2 and 3, consist of a bearing arranged diagonally or transverse with respect to the direction of advance of the corrugated cardboard web 2. As shown in FIG. 2, each pressure unit 5 includes a bearing 6 on which at least one pressure element 7 is attached so as to press against the upper surface of the lower flight 4.1 of conveyor belt 4.

As can be seen in FIGS. 2 and 3, each pressure element 7 is connected to the respective bearing 6 in a freely movable manner merely via at least one elastic medium or element 11. In the embodiment shown in FIG. 3, pressure springs 11 are used as an elastic medium which are supported, on the one hand, at the underside of the bearing 6 and, on the other hand, on the upper surface of the pressure element 7. With this arrangement of springs 11, pressure element 7 is pressed against the lower flight 4.1 of the conveyor belt 4 which, in turn, pressures the entire surface of the corrugated cardboard web 2. The pressure springs 11 are loaded by the dead weight of the bearing 6 and transfer this weight to the pressure element 7.

According to FIG. 2, several pressure elements 7 may be arranged side by side and preferably coupled with each other on a common bearing 6.

Figure 8:
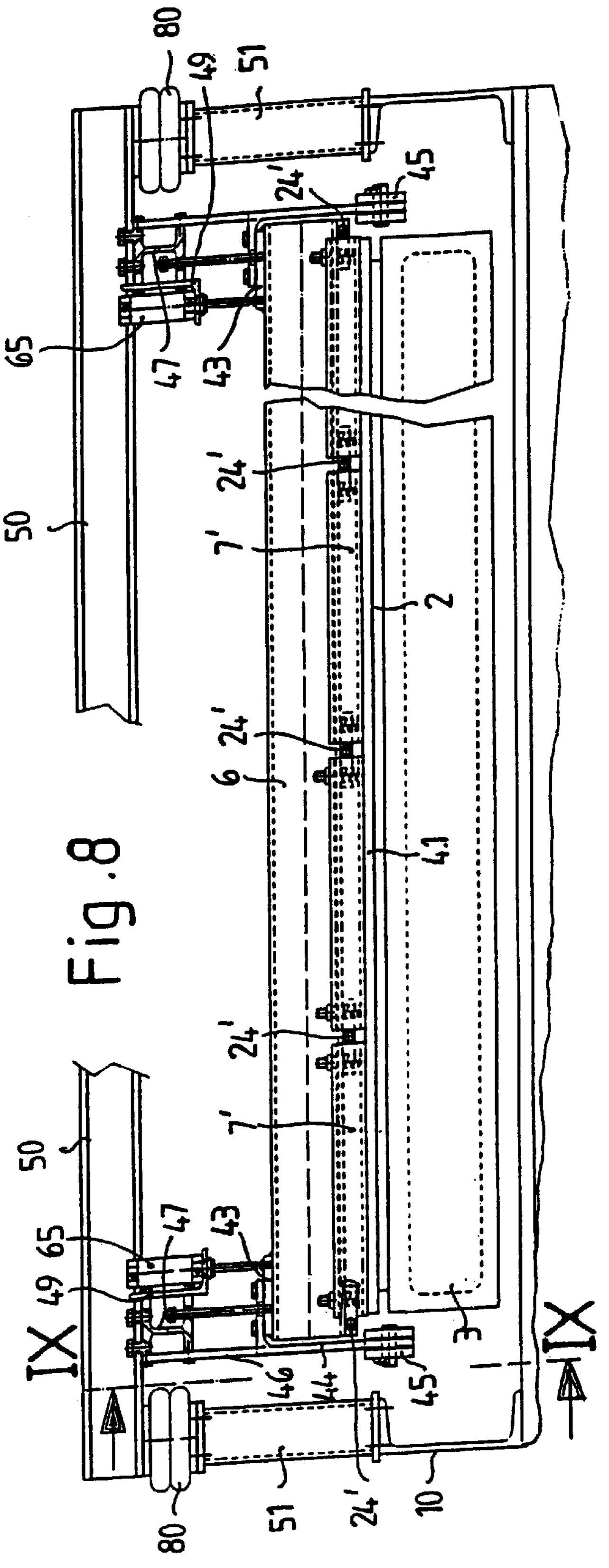
FIG. 8 shows a front view of an additional embodiment of the invention.
Figure 9:
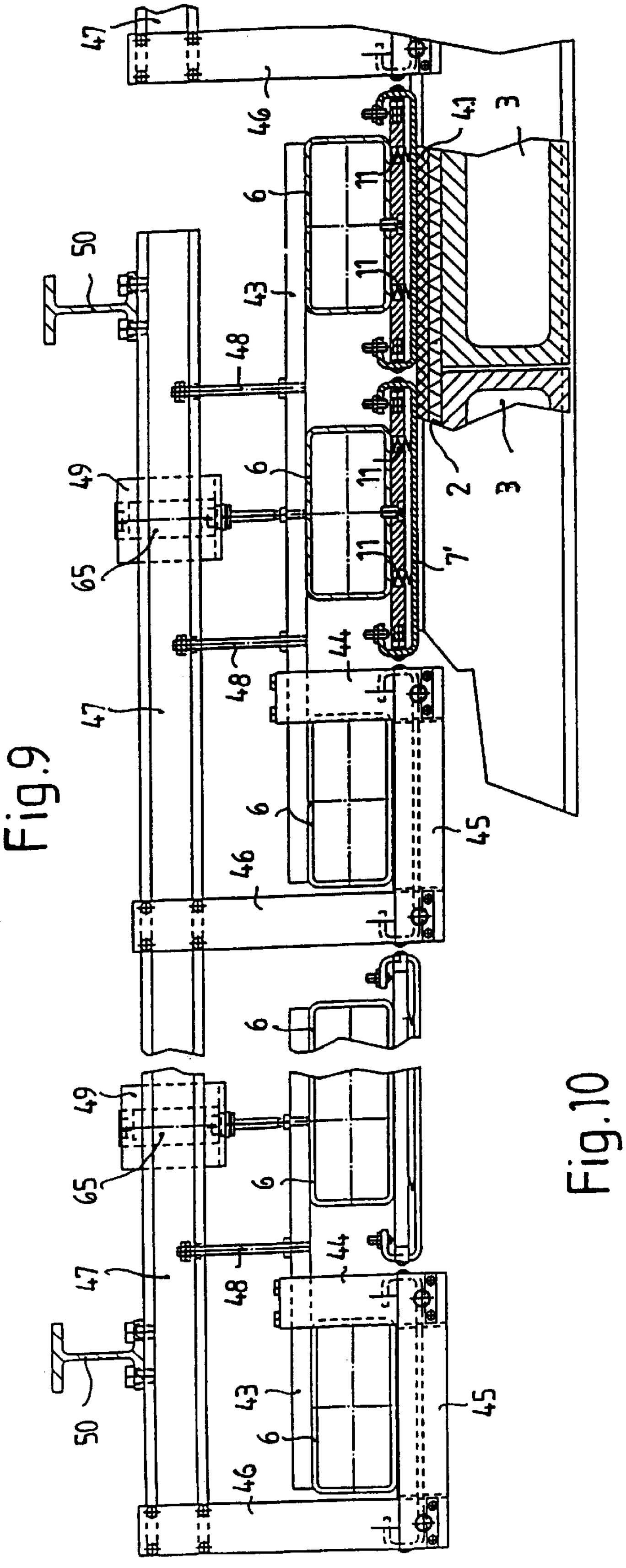
FIG. 9 shows a cross section along the line IX—IX in FIG. 8.

It can also be gathered from FIG. 2 that the bearing 6, on both sides of the corrugated cardboard web 2 in the plane of the upper surface of the lower flight 4.1 of the conveyor belt, engages the machine frame 10 (or lateral carriers 47 as shown in FIGS. 8 and 9). This engagement is shown in greater detail in FIG. 3. The bearing 6 is connected at each end to a pivotable lever 6.1. Each pivotable lever 6.1 is connected to frame 10 via an intermediate lever 14 and hinged joints 13.1 and 13.2.

According to FIG. 2, the bearing 6 may be moved in a vertical direction by means of an outer lifting arrangement, such as 65, for example, which may be connected to pneumatic cylinders. That is, by means of the rods 65, the pressure elements 7 may be loaded or released via bearings 6 and pressure springs 11.

Figure 4:
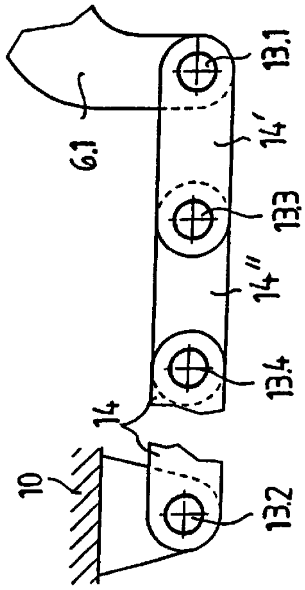
FIG. 4 shows an additional possibility for shaping the intermediate joint in an embodiment according to FIG. 3.

As shown in FIG. 4, lever 6.1 may alternatively be connected to frame 10 via two intermediate levers 14' and 14" and appropriate intermediate joints 13.1, 13.2, 13.3 and 13.4.

It can be gathered particularly from FIG. 3 that according to a first embodiment, the pressure element 7 encloses the bearing 6 and has a rectangular form. The bearing 6 is inserted between spring pairs 11 or 21 of the pressure element 7 on the upper and lower side.

The springs 21 are "softer" than the springs 11. The purpose of springs 21 is to assure that during lifting of the bearing 6 the impact of this bearing against the pressure elements 7 is deflected. In this way, springs 21 have a type of shock absorption function.

Furthermore, it can be gathered from FIG. 3 that the bearing 6 is connected with shock elements 24 in position to press against the inside of the front and rear walls of pressure element 7. These shock elements 24 are preferably located near the area of the horizontal 12 plane between the upper surface of the lower flight 4.1 of the conveyor belt 4 and the underside of the pressure element 7 and thus are in a position for absorbing friction forces from the pressure element 7. Advantageously, shock elements 24 are located near the friction surface in order to also minimize or prevent undesirable torque of the pressure element 7 and they are arranged in a plate 25 which is rigidly connected to the bearing 6.

As can be seen in FIG. 3, the vertical plane of a resulting force against the geometric center of the pressure element 7 is moved back, that is, against the direction of advance L of the corrugated cardboard web 2. Thus, the shock element 24 on the right in FIG. 3 does not rest against the inside of the pressure element 7, while the left shock element 24 pressures the inside of the pressure elements 7. The arrangement counteracts any tendency of the pressure element 7 to tilt, for example, due to an unexpected increase in friction.

Moreover, it can be gathered from FIG. 3 that the spring pairs 21 on the upper surface, respectively, surround stop screws 27 which extend through the top of the pressure element 7. Stop screws 27 help limit a possible undesirable vertical movement of the pressure element 7. This is necessary for at least those pressure elements 7 which are located outside the minimal working width of the corrugated cardboard web 2. During the adjustment of the operating conditions of an entire pressure unit, the pressure unit is placed on a level surface, for example the heating surface, and the bearings 6 are loaded in a manner similar to the one during the operational state. In this way, it is assured that the pressure elements do not exert any pressure in the above-mentioned areas.

The aforementioned upper springs 21 serve for inserting the bearing 6 approximately in the central area of the pressure element 7. These pressure elements 7 are completely free and can rest against the upper surface of the lower flight 4.1 of the conveyor belt.

Moreover, it can be seen in FIG. 3 that there exists also the possibility of increasing the pressure provided through the bearing 6 via a piston cylinder unit with a piston rod 65, so that in addition to the dead weight of bearing 6, an additional controlled pressure can be applied to the corrugated cardboard web 2. It is thus made possible to appropriately adjust desired pressure applied by the pressure elements 7. Good stability of the entire system results from the interaction with the intermediate levers 14 or 14' or 14" shown in the FIGS. 2, 3 and 4, and the joints 13.1 to 13.4, which must be positioned approximately in the plane of the friction forces between the pressure element 7 and the lower flight 4.1 of the conveyor.

Figure 5:
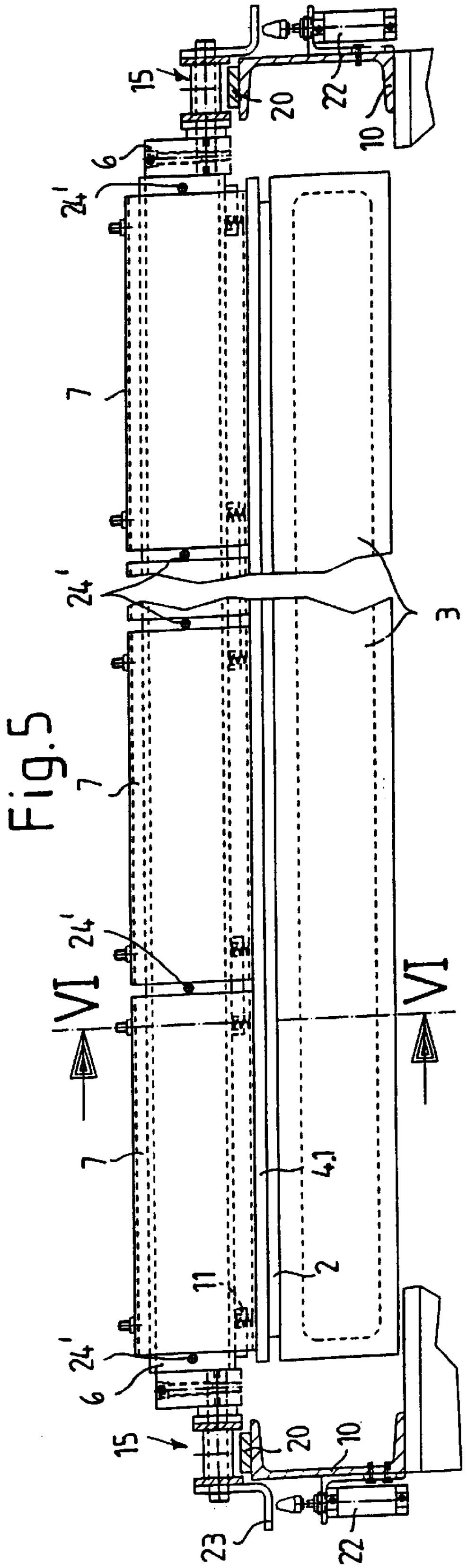
FIG. 5 shows a schematic front view of an additional possibility of an embodiment of the invention.
Figure 6:
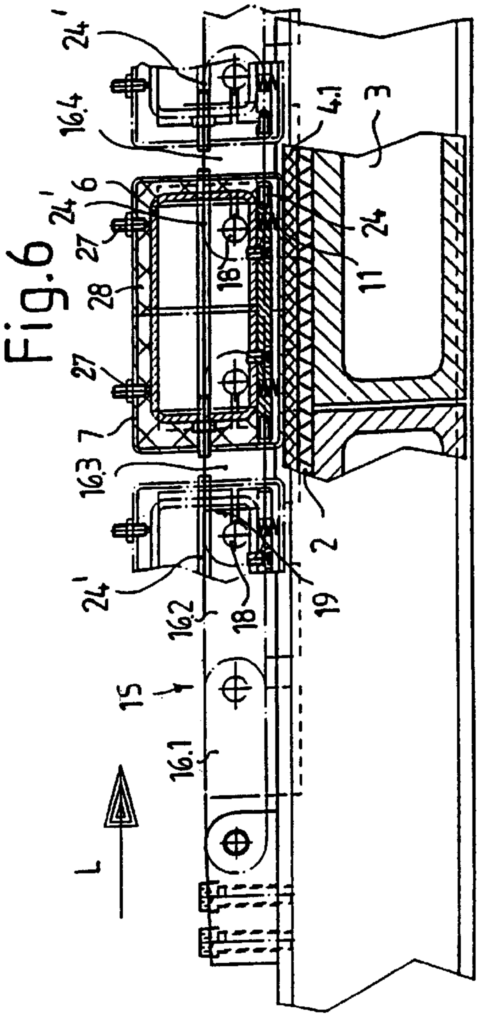
FIG. 6 shows a cross section along the line VI—VI in FIG. 5.

In the embodiment of the invention shown in FIGS. 5 and 6, there exists the possibility that in the direction of advance of the corrugated cardboard web 2, successively arranged bearings 6, respectively provided with at least one pressure element 7, are connected with each other on both sides via links 16.1, 16.2, 16.3 and 16.4 of a chain 15 engaging the machine frame 10. In particular, it can be gathered from FIG. 6 that for this purpose, bolts 18 of the chain 15 are wedged with a shim 19 of the respective bearing 6.

In accordance with FIG. 5, the chain 15 may also be guided in a guide element 20 of the machine frame 10. Moreover, it can be gathered from FIG. 5 that the chain 15 has at least one angle element 23 which can be pressed upwardly by a lifting element 22 attached to the machine frame 10. The force to the corrugated cardboard web 2 provided through bearing 6 and pressure elements 7 may be adjusted via the lifting element 22 and the angle element 23.

Moreover, it can be gathered from FIG. 6 that between the upper surface of the bearing 6 and the underside of the pressure element 7 a separation layer 28 is located which serves as thermal insulation, for example, in the form of thermo- or mineral cotton. Also here, analogous to the embodiment according to FIG. 3, again stop elements 27 can be used to adjust the entire unit and/or to secure it against undesirable movement.

The stop elements 27 have the same function as the springs 21 in FIG. 3. Stop elements may be in the form of screws with a built-in elastic pressure plate.

Figure 7:
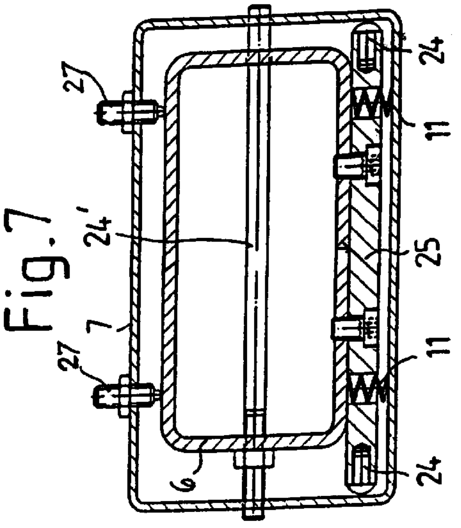
FIG. 7 shows an enlarged representation of an additional possibility for an embodiment of the pressure unit in cross section.

It can be gathered from the example according to FIG. 7 that the shock elements 24, in a manner analogous to the embodiment of FIG. 3, are arranged in a plate 25 which, in turn, is traversed by the lower springs 11. This plate 25 is rigidly attached, such as by screws for example, at the underside of the bearing 6. Above, again, stop elements 27 are located, so that also in this example, the pressure element 7 is connected with the bearing 6 in a freely movable manner via the springs 11 and the elastic stop elements 27.

In the center of the bearing 6, respectively between adjacent pressure elements 7, axial stops 24' are located which are to prevent the movement of the pressure elements 7 in the longitudinal direction of the bearing 6, that is, transversely with respect to the direction of advance of the corrugated cardboard 2. These stops 24' are provided in connection with various embodiments (see FIGS. 2, 3, 5, 6, 7, 8 and 10).

In the case of the above-mentioned examples, the pressure element 7, which preferably has a rectangular shape, surrounds the bearing 6. Several pressure elements 7 may be provided on bearing 6.

Figure 10:
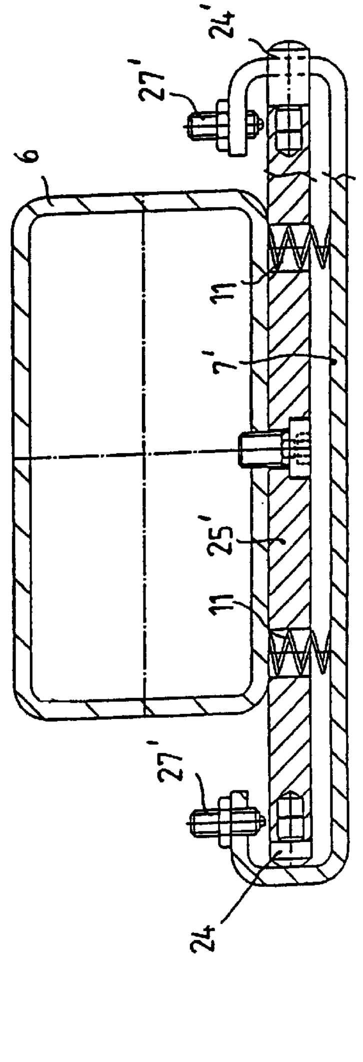
FIG. 10 shows a cross section of an individual representation of a pressure unit.

In another embodiment of the invention, as shown in FIG. 10, there also exists the possibility for the pressure element 7' to be C-shaped and to be arranged horizontally in a freely movable manner via at least one elastic medium, for example the two springs 11, at the underside of the bearing 6. Again, an intermediate plate 25' is used which is attached at the underside of the bearing 6. Plate 25' includes the shock elements 24 in accordance with the example according to FIG. 3.

Stop elements 27' contact plate 25 to limit the movement pressure element 7'.

In the example according to FIGS. 8 and 9, several pressure elements 7' according to FIG. 10 are used. In this example, according to FIG. 9, the bearing 6 is attached via intermediate levers 43, 44, 45 and 46 at two lateral carriers 47 which, in turn, are rigidly connected with a traverse 50 extending transversely with respect to the corrugated cardboard web 2. With this arrangement, the same effect is achieved as in the embodiment according to FIG. 3 or FIG. 4, so that it is assured that the pressure elements 7' pressure the entire corrugated cardboard web 2 surface in a functionally correct manner via the lower flight 4.1 of the conveyor belt.

It can be seen in FIG. 8 that the traverse 50 is attached to the machine frame 10 on each side via a lifting device 51, consisting of a support and, for example, an air bellows cylinder 80. A complete section with several load units, respectively consisting, for example, of three bearings 6 as well as the accompanying pressure elements 7', is suspended on two traverses 50.

The lifting devices 51 offer the possibility for lifting the traverses 50, respectively, by approximately 150 to 200 mm and thereby for lifting a section with, for example, ten load units with respectively three bearings 6, away from the corrugated cardboard web, thereby putting it out of operation. This is, for example, necessary in the case of machine stops, for cleaning purposes or for the purpose of inspecting the heating surface.

In contrast thereto, the lifting units with respectively one mounting 49 and one lifting cylinder 65 serve for lifting a single load unit with three bearings 6 which are connected with each other via two plates 43.

The lifting cylinder 65 operation facilitates a fine adjustment by up to approximately 35 mm for a single load layer. Lifting cylinders 65 also allow one or several load units to be put out of operation to achieve a reduction in heat transfer from heaters 3.

Figure 11:
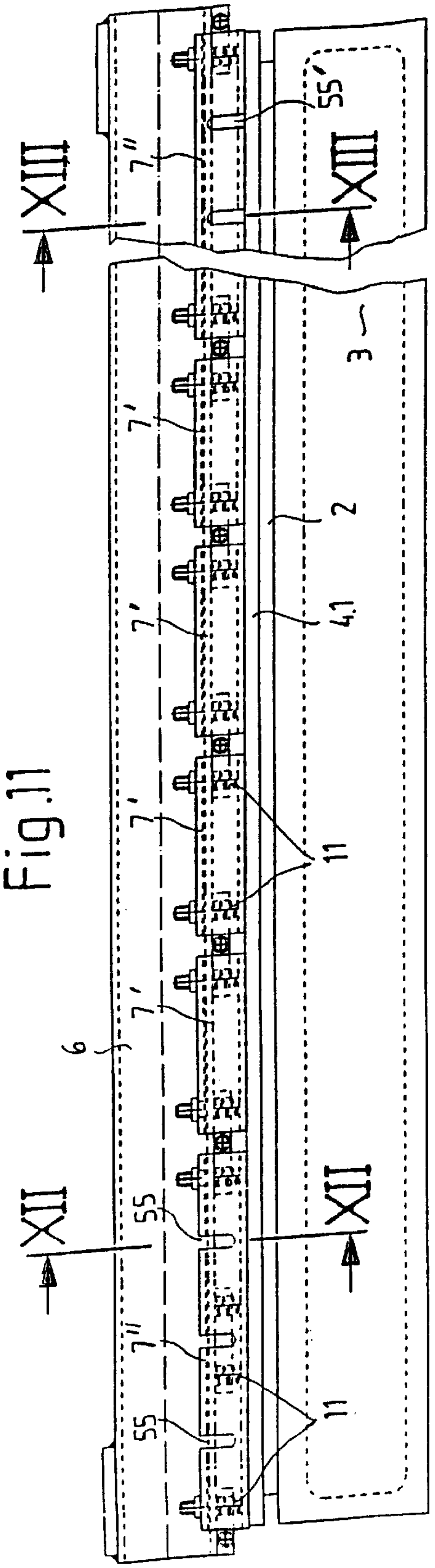
FIG. 11 shows a front view of an additional embodiment of the invention.
Figure 13:
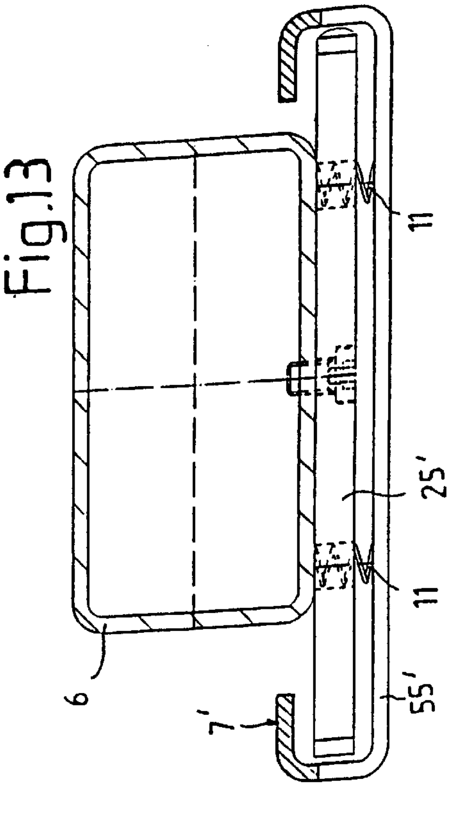
FIG. 13 shows a cross section along the line XIII—XIII according to FIG. 11.
Figure 12:
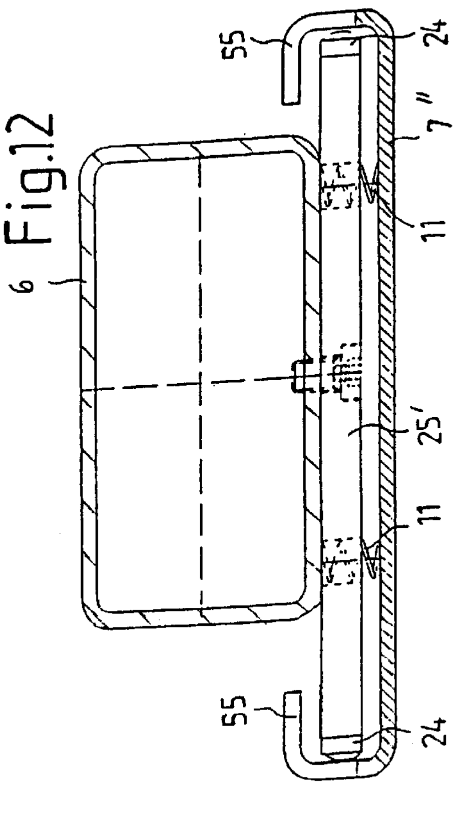
FIG. 12 shows a cross section along the line XII—XII in FIG. 11.

In the embodiment according to FIGS. 11, 12 and 13, the C-shaped pressure elements 7" are created in such a way, that they have in the respective edge area a greater length than the pressure elements 7' in the central area. Furthermore, it can be seen that the pressure elements 7" have recesses 55 or 55' which are at a distance from each other which are incorporated either from above (FIG. 12) or from below (FIG. 13) into the respective C-shaped pressure elements 7". This construction assures a very good adaptation of the respective pressure elements 7' or 7" to the pressure zones of the lower flight 4.1 of the conveyor belt 4, and achieves an overall uniform pressure distribution on the corrugated cardboard web 2 to be processed. In all, due to the particularly elastic pressure elements 7", this results in a good adaptation to respective conditions.

This elasticity is particularly important in the case of smaller working widths when no corrugated cardboard is passing in the outer area and the lower flight 4.1 of belt 4 rests directly on the heating plate 3. If the operation takes place without a conveyor belt, the edge of the corrugated cardboard web must not encounter an edge of the pressure element since such contact could damage the cardboard edge.

Figure 15:
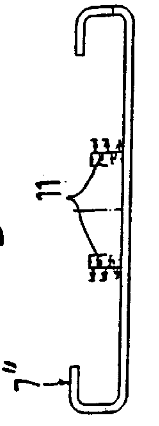
FIG. 15 shows a schematic side view of the pressure element in accordance with FIG. 14.
Figure 14:
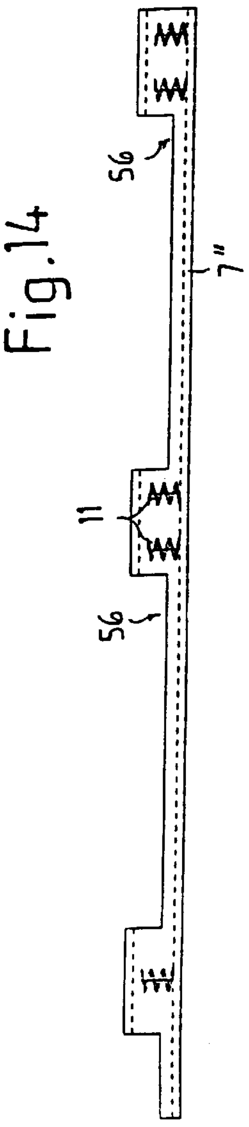
FIG. 14 shows a schematic front view of an additional embodiment of the pressure element.
Figure 16:
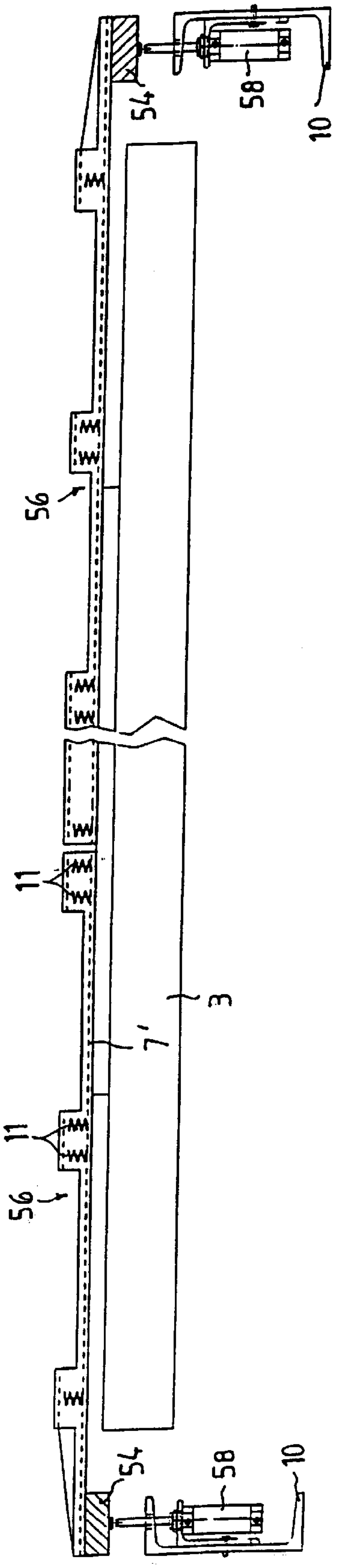
FIG. 16 shows a schematic front view of an additional variation of an embodiment of the pressure element.

According to FIGS. 14, 15 and 16, in another embodiment of the invention, there also exists the possibility that the respective pressure elements 7" have recesses 56 on the upper surfaces and can be lifted and lowered by means of piston and cylinder units 58 in the end area, respectively, via lateral strips 54. These piston and cylinder units 58 are attached at the machine frame 10 and on the underside can press against the lateral strips 54 via the respective piston rods and thereby can guide the pressure elements 7" either into a resting state or into an operational state. Again, analogous to the above-mentioned embodiments, pressure springs 11 are provided which are supported at the bearings 6, not shown in greater detail, so that also in this example, the respective pressure elements 7" are arranged in a freely movable manner at the respective bearing 6 via the springs 11.

This embodiment is advantageous, for example, when corrugated cardboard webs with many different working widths are run.

Figure 17:
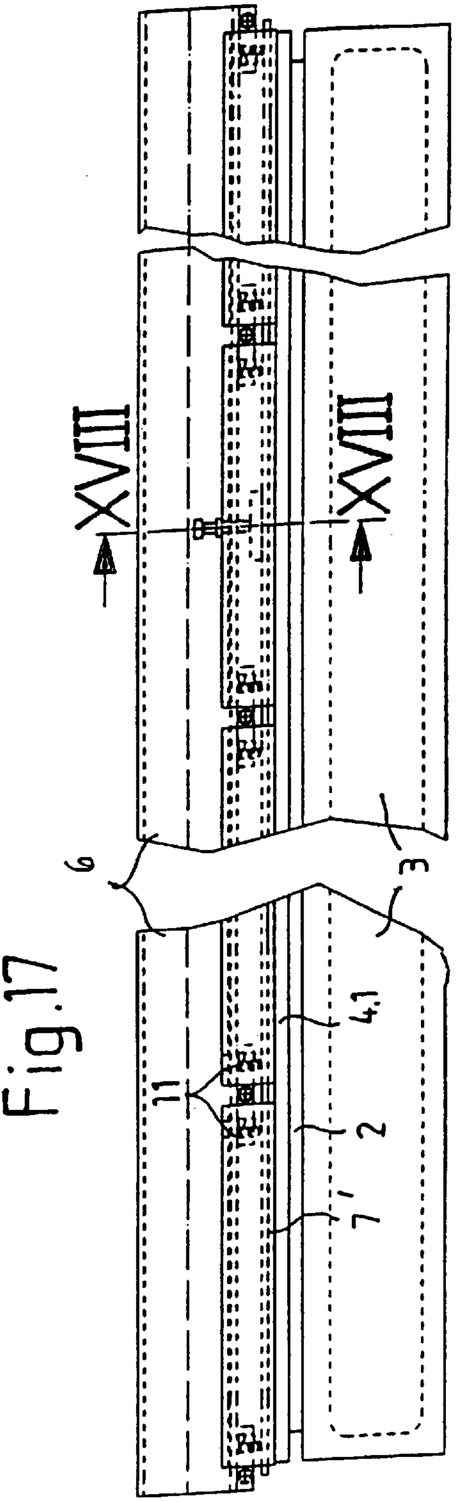
FIG. 17 shows a schematic front view of an additional embodiment of the invention.
Figure 18:
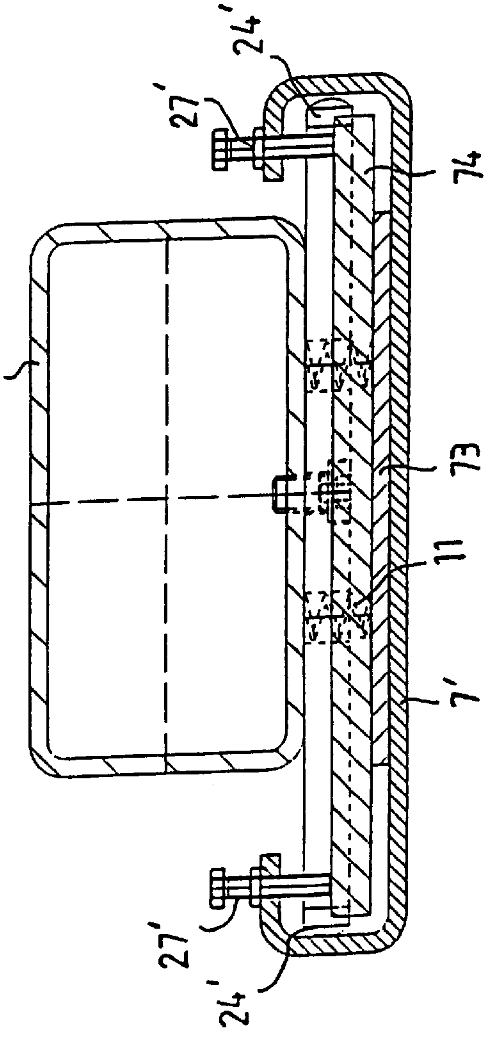
FIG. 18 shows a cross section along the line XVIII—XVIII in FIG. 17.

In the example according to FIGS. 17 and 18, a spring plate 73 is used which rests with its entire contact width on the inner surface of the pressure element 7'. This spring plate 73 is attached at the bearing 6 via a plate 74 and attachment means and, in turn, is acted upon by the above-mentioned springs 11. In this case, the springs 11 press on the spring plate 73 and not against the pressure element 7'. Again, shock elements 24' are provided similarly to the above-mentioned embodiments. Also, this variation is particularly suited for corrugated cardboard webs with large differences in width.

Figure 19:
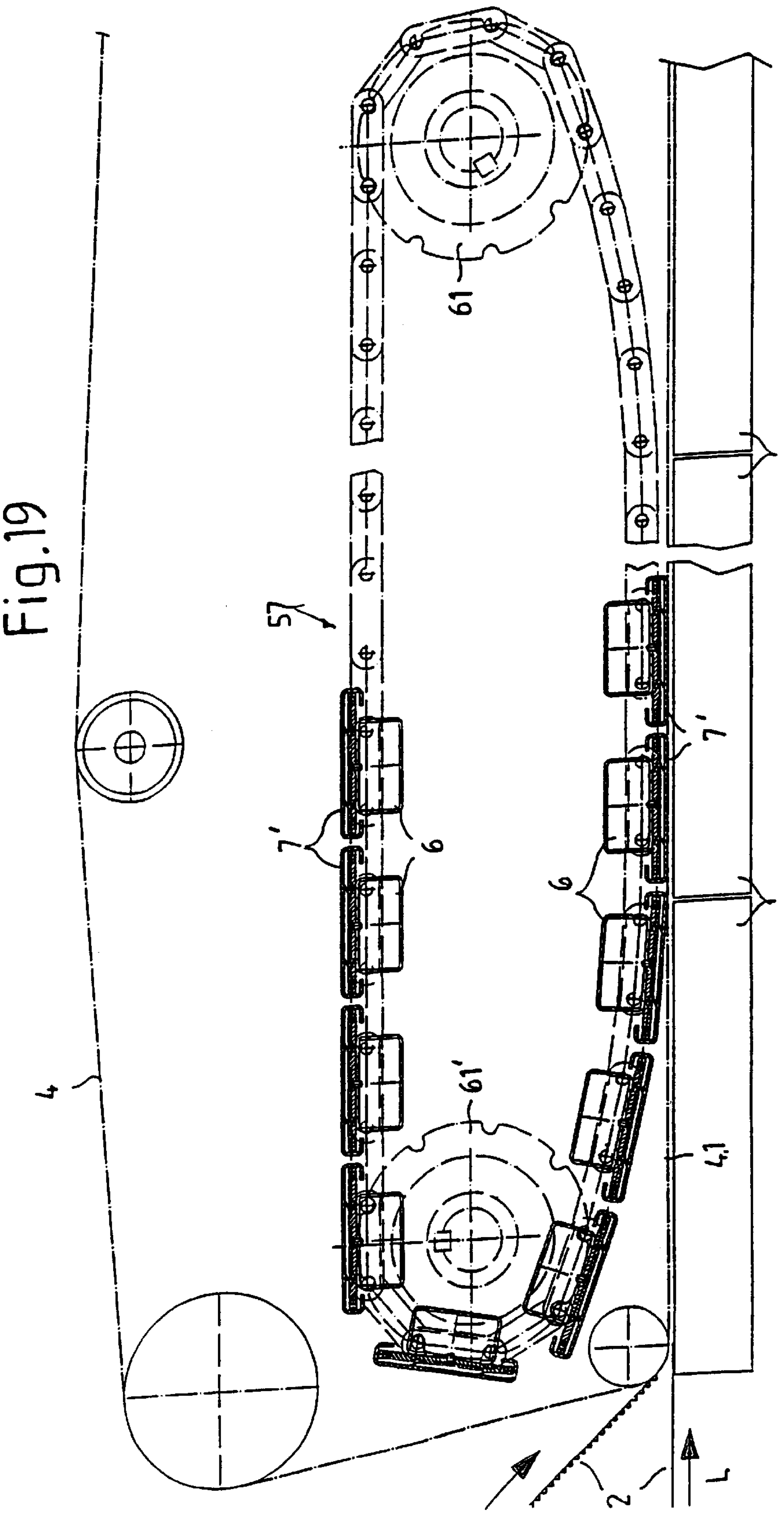
FIG. 19 shows a schematic side view of a conveyor arrangement with a chain.

According to FIG. 19, there also exists the possibility that the pressure elements 7' and the bearings 6 are attached at least one circulating conveyor chain 57. Preferably, there are two parallel extending conveyor chains 57, spaced apart so as to reside on both sides of the machine. Each chain 57 runs across sprocket wheels 61 and 61', one of which may be driven. For example, the sprocket wheel 61 may be driven. Also, in this example, the respective pressure element 7' is C-shaped and may, for example, be formed in a manner analogous to the embodiment according to FIG. 10.

The conveyor chain 57 may be moved in forward and backward direction in order to prevent undesirable residues from depositing. Moreover, the circulating conveyor chain 57 may be provided across its entire length with pressure elements 7', wherein furthermore, for example, in the area of the upper flight of the chain 57 an indirect heating of the pressure elements 7' can be carried out.

Figure 20:
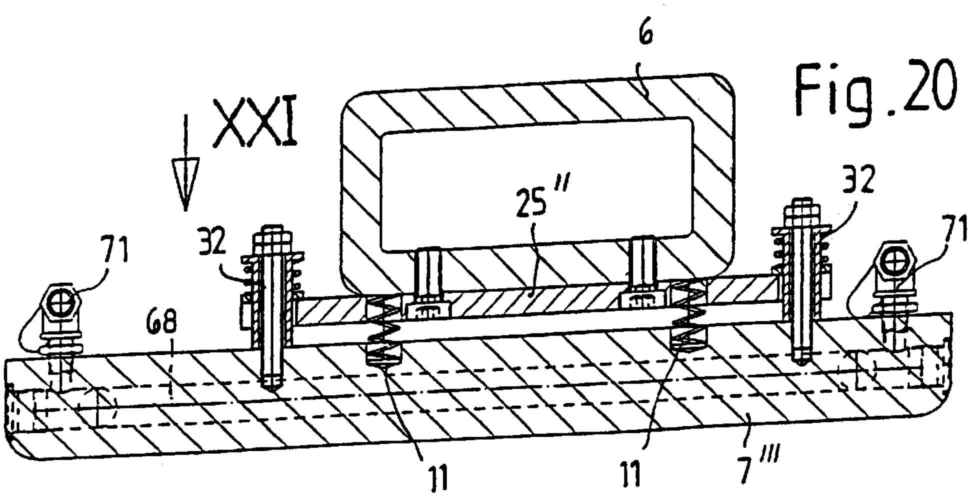
FIG. 20 shows a cross section along the line XX—XX in FIG. 21.
Figure 21:
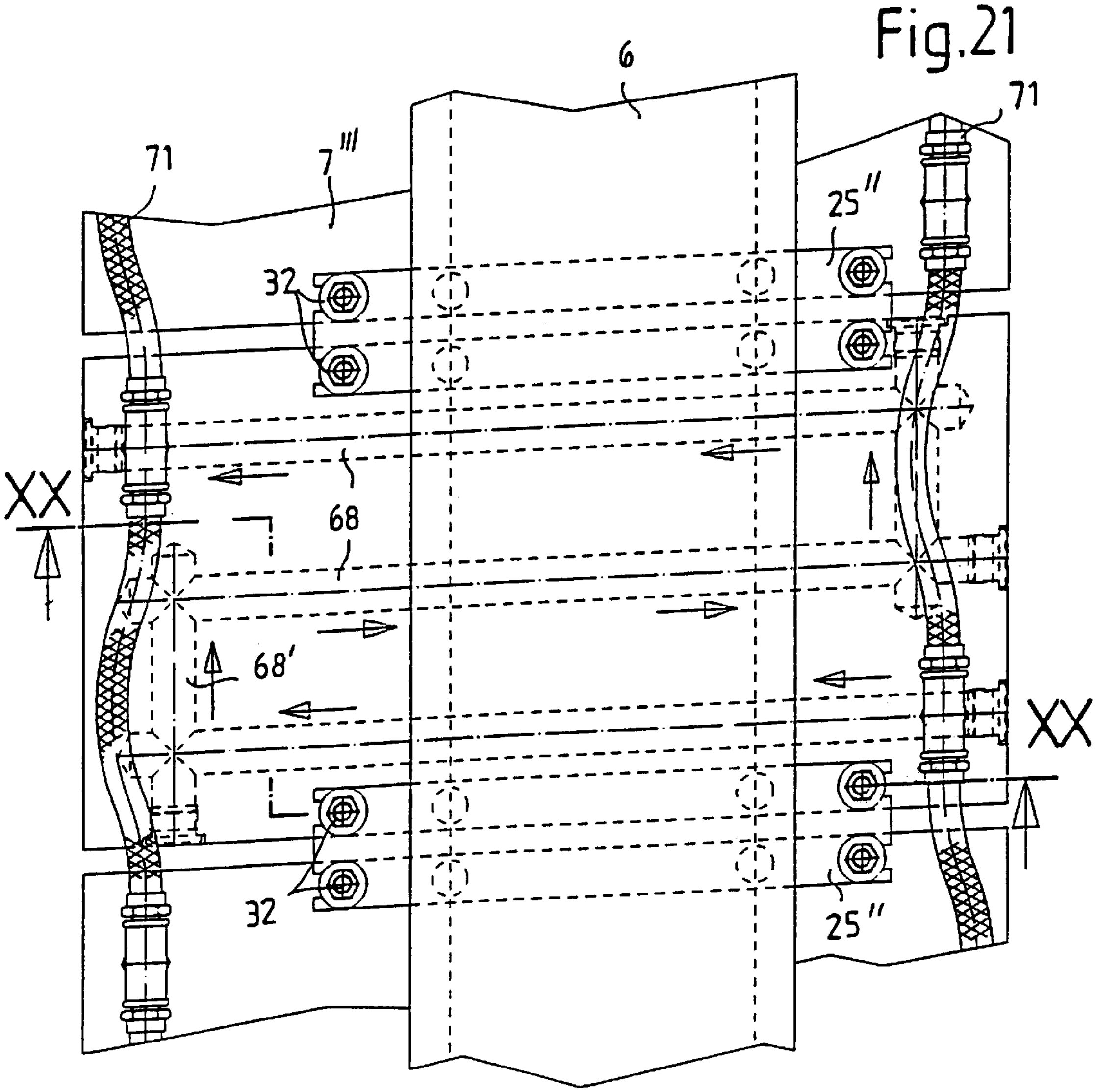
FIG. 21 shows a plan view of the embodiment according to FIG. 20 with a heating arrangement.

According to FIGS. 20 and 21, there exists also the possibility that a pressure element 7''' is used which is provided with a heating arrangement. In this case, again, an intermediate plate 25'' as shown in FIG. 20 is used which is attached to the underside of the bearing 6. Springs 11 are supported, on the one hand, on the bearing 6 and, on the other hand, pressure the pressure element 7'''. This pressure element 7''' is held in its position via spacers 32 in such a way that, analogous to the above-mentioned embodiments, it is again freely movable with respect to the bearing 6.

As can be seen in particular in FIG. 21, the pressure element 7''' may have longitudinally and diagonally extending bores 68 or 68' which are connected via elastic hoses 71 or pipes with at least one heating source, not shown in greater detail. In this embodiment, the pressure element 7''' is thicker than in the above-mentioned embodiments in order to offer possibilities for receiving the bores 68 or 68'. This embodiment may, for example, be used in the case of the "double-double" type of corrugated cardboard in order to heat the upper cover web of the lower, one-sided corrugated cardboard layer prior to gluing with the second one-sided corrugated cardboard layer.

In each case, a pressure unit 5, consisting of the bearing 6 and several pressure elements 7 or 7' or 7'' or 7''' is created which assures a good adaptation to the corrugated cardboard web 2 and exerts no negative forces on the above-mentioned web. Hereby, a considerable improvement in quality is achieved in a simple manner.

In all embodiments described so far, for example in accordance with FIGS. 8 and 9, the pressure elements 7' are stationary with respect to the direction in which the corrugated cardboard web advances. That is, pressure elements 7' are arranged on the heating surface always in the same position. According to FIGS. 22 and 23, a type of construction is shown wherein the pressure elements can be moved with respect to the heating surface.

Figures 22, 23:
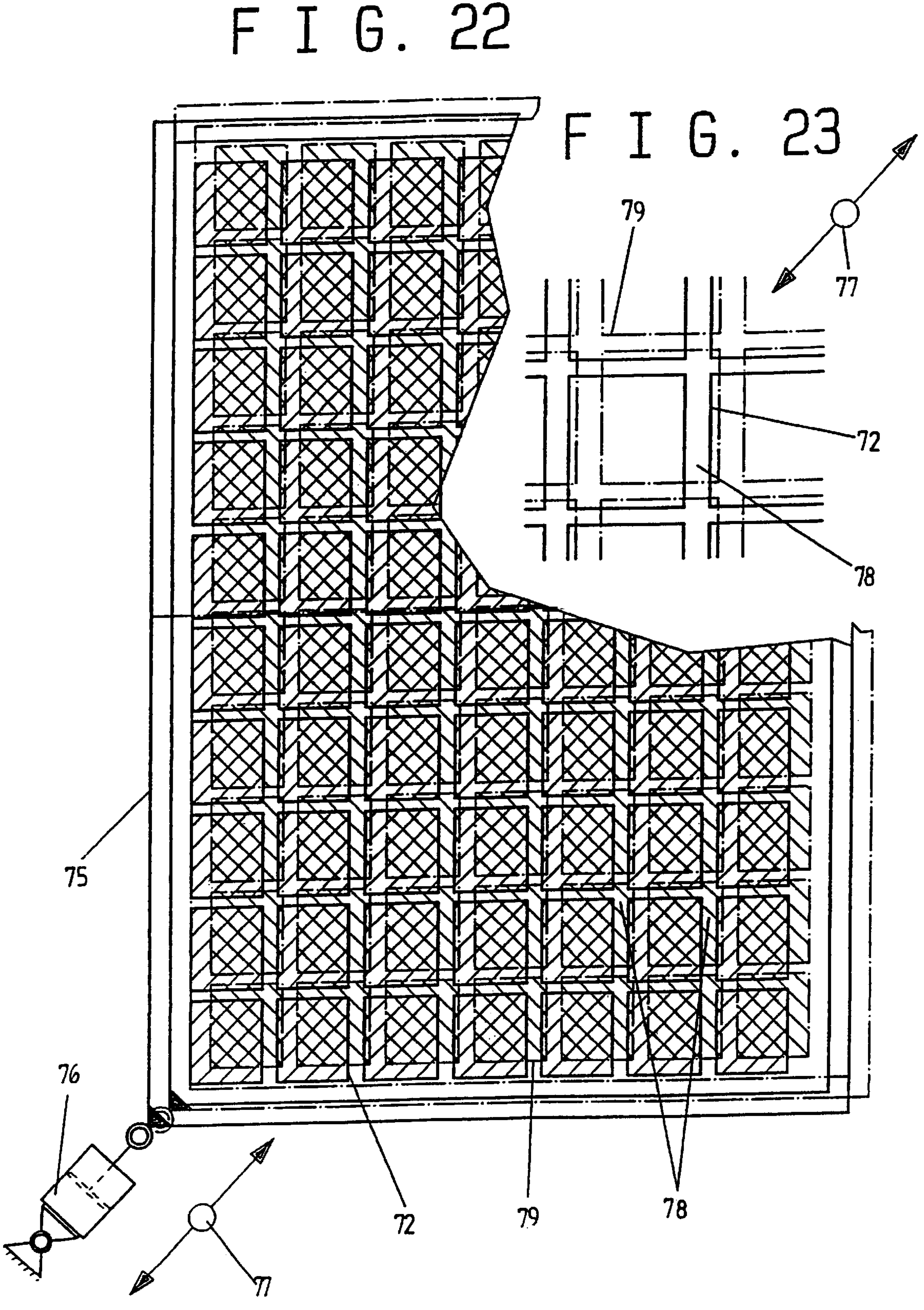
FIG. 22 shows a plan view of the movable pressure elements.
FIG. 23 shows a detail of the movable pressure elements shown in FIG. 22.

FIG. 22 and the more detailed view presented in FIG. 23, both show a plan view of the movable pressure elements. The initial position 72 of the pressure elements is shown by means of unbroken lines. During the operation, dust, paper fibers, glue residues and dirt accumulate after some time in the spaces 78 between the pressure elements. The uneven wear due to friction of the heating plates is also disadvantageous because the intermediate spaces 78 are not acted upon by pressure elements and, for that reason, show less wear.

In order to solve this problem, for example in the case of the embodiment according to FIGS. 8 and 9, the carriers 47 are no longer rigidly connected with the traverse 50 but are mounted via intermediate levers in a pendulum-like manner, not shown in greater detail. The carriers 47 are thus suspended from the traverse 50 in a pendulum-like manner.

The entire pressing system, which is suspended in a pendulum-like manner, is shown in FIG. 22 as a frame 75. A lifting system or an adjustment mechanism 76 (for example, a hydraulic or pneumatic cylinder) periodically moves the pressing system back and forth with the frame 75 in the direction 77. The pressure elements 7' are thus moved periodically back and forth between position 72 and position 79, represented in dots and dashes. By means of these steps, no residues can collect and the surface of the heating plate is worn evenly and therefore remains level.

The above described preferred embodiments are intended to illustrate the principles of the invention, but not to limit the scope of the invention. Various other embodiments and modifications to these preferred embodiments may be made by those skilled in the art without departing from the scope of the following claims.

What is claimed is:

1. In a heating device for a corrugated cardboard installation, the heating device including a plurality of heating plates arranged successively in a direction of advance of a corrugated cardboard web, and further including at least one pressure unit, the pressure unit having a bearing which is arranged transversely with respect to the direction of advance of the corrugated cardboard web and having at least one pressure element connected to the bearing, the improvement comprising:

(a) for each respective pressure element, a plurality of elastic elements connecting said pressure element to the bearing, the plurality of elastic elements being spaced apart across a surface of said pressure element and enabling the pressure element to move in all degrees of freedom with respect to the bearing.

2. The device of claim 1 wherein a lower flight of a continuous conveyor belt is in position to press against a surface of the corrugated cardboard web positioned in the device and wherein at least one pressure element presses against an upper surface of the lower flight of the conveyor belt.

3. The device of claim 2 wherein the bearing engages a machine frame on both sides of the corrugated cardboard web substantially in a plane defined by the upper surface of the conveyor belt along its lower flight.

4. The device of claim 3, further comprising (a) at least one intermediate joint and at least one intermediate lever connected between the bearing and the machine frame.

5. The device of claim 4 further comprising:

(a) a plurality of the bearings arranged successively in the direction of advance of the corrugated cardboard web, each bearing respectively provided with at least one pressure element, and the bearings being connected with each other at each end via members of a chain which engages the machine frame.

6. The device of claim 5 wherein each bearing is connected to the chain via a bolt which extends from the chain and is wedged in a shim of the respective bearing.

7. The device of claim 5, further comprising a guide element associated with the machine frame for guiding the chain.

8. The device of claim 5, further comprising at least one angle element associated with the chain and a lifting element mounted on the machine frame and adapted to act on the angle element to lift the chain.

9. The device of claim 1 wherein each elastic element between the bearing and the pressure element comprises at least one spring which evenly presses against the pressure element.

10. The device of claim 9, further comprising:

(a) a plurality of shock elements connected to a plate which is connected to an underside of the bearing, each shock element residing in a position adjacent to an inside wall of the pressure element; and (b) each elastic element traverses the plate.

11. The device of claim 1 wherein each elastic element between the bearing and the pressure element comprises at least one rubber element which evenly presses against the movable pressure element.

12. The device of claim 1 wherein in the pressure element surrounds the bearing.

13. The device of claim 12 wherein the plurality of elastic elements between the bearing and the pressure element include at least one spring which evenly presses against a bottom of the pressure element, and the device further includes:

(a) at least one spring acting between the bearing and a top of the pressure element.

14. The device of claim 13 wherein each spring acting between the bearing and the top of the pressure element is associated with a stop screw which traverses the top of the pressure element.

15. The device of claim 12, further comprising:

(a) a separation layer located between the bearing and the pressure element, the separation layer serving as thermal insulation.

16. The device of claim 12, further comprising:

(a) a plurality of resilient stop elements extending from a top of the pressure element in position to press against a top surface of the bearing.

17. The device of claim 1 further comprising:

(a) a plurality of shock elements connected to the bearing, each shock element residing in a position adjacent to an inside wall of the pressure element.

18. The device of claim 17 wherein each shock element is located substantially adjacent to a plane defined by an underside of the pressure element.

19. The device of claim 18 wherein the shock elements are arranged on a plate attached to an underside of the bearing.

20. The device of claim 1 wherein the pressure element is C-shaped and is connected to an underside of the bearing with at least one elastic medium.

21. The device of claims 20, further comprising:

(a) an intermediate plate located between the pressure element and an underside of the bearing; and (b) shock elements connected to the plate in position to press against the pressure element.

22. The device of claim 21 wherein the bearing is attached via intermediate levers and lateral carriers, to a traverse extending transversely across a path of the corrugated cardboard web.

23. The device of claim 22 wherein the traverse is attached to the machine frame via at least one piston/cylinder unit.

24. The device of claim 23, further comprising:

(a) a lifting unit connected between the intermediate lever and the bearing.

25. The device of claim 20 wherein each pressure element includes a spring plate resting with its entire contact width on an interior surface of the respective pressure element.

26. The device of claim 25 wherein the spring plate is attached to the respective pressure element via a plate.

27. The device of claim 20 wherein each C-shaped pressure element located in an edge area of the bearing further includes spaced apart recesses therein, and each such pressure element is greater in length than each pressure element not located in the edge area.

28. The device of claim 27 wherein the recesses extend in the direction in which the corrugated web travels through the device.

29. The device of claim 20 wherein each pressure element has top recesses and each pressure element associated with the bearing is adapted to be lifted and lowered via lateral strips which are acted upon by piston/cylinder units connected to the machine frame.

30. The device of claim 1, further comprising two spaced apart circulating conveyor chains having each pressure unit attached thereto.

31. The device of claim 30 wherein each chain runs over two spaced apart sprocket wheels.

32. The device of claim 1 further comprising a heating arrangement for heating at least some of the pressure elements.

33. The device of claim 32 wherein each pressure element to be heated includes longitudinally and transversely extending bores which are connected via conduits with at least one heating source.

34. The device of claim 1 wherein each pressure unit is mounted on at least one raisable and lowerable piston/cylinder unit.

35. The device of claim 1 wherein each pressure unit acts against an upper heating/support surface on the corrugated cardboard web positioned in the heating device.

36. The device of claim 1 wherein each bearing is supported on a plurality of carrier members which are in turn suspended from traverse elements in a pendulum-like manner.

37. The device of claim 36, further comprising:

(a) a positioning system for positioning each bearing via the pendulum connection to the traverse elements.

38. The device of claim 1 wherein at least one pressure unit is located in a tension section of the device separate from a heating section of the device.

* * * * *